United States Patent
Donaldson et al.

(10) Patent No.: US 12,207,644 B2
(45) Date of Patent: Jan. 28, 2025

(54) INSECT BARRIER

(71) Applicant: Engineered Materials, Inc., Buffalo Grove, IL (US)

(72) Inventors: Keith Donaldson, Buffalo Grove, IL (US); John Franey, Branchburg, NJ (US); Nancy Harper, Branchburg, NJ (US)

(73) Assignee: Engineered Materials, Inc., Buffalo Grove, IL (US)

( * ) Notice: Subject to any disclaimer, the term of this patent is extended or adjusted under 35 U.S.C. 154(b) by 172 days.

(21) Appl. No.: 17/168,345

(22) Filed: Feb. 5, 2021

(65) Prior Publication Data

US 2021/0161121 A1    Jun. 3, 2021

Related U.S. Application Data

(62) Division of application No. 14/811,444, filed on Jul. 28, 2015, now Pat. No. 11,291,199.

(Continued)

(51) Int. Cl.
*A01M 29/28* (2011.01)
*A01M 29/34* (2011.01)

(52) U.S. Cl.
CPC ............ *A01M 29/28* (2013.01); *A01M 29/34* (2013.01)

(58) Field of Classification Search
CPC ...... A01M 29/00; A01M 29/24; A01M 29/28; A01M 29/30; A01M 29/34; A01M 1/22; A01M 1/223; A01M 1/226

(Continued)

(56) References Cited

U.S. PATENT DOCUMENTS

| | | | | |
|---|---|---|---|---|
| 855,588 | A | * | 6/1907 | Prudden ................. B63B 59/04 405/218 |
| 2,165,192 | A | * | 7/1939 | Muirhead ............. A01M 29/34 52/378 |

(Continued)

FOREIGN PATENT DOCUMENTS

| | | | | |
|---|---|---|---|---|
| AU | 2003260444 A1 | * | 3/2004 | ............ A01M 1/223 |
| AU | 2010230839 A1 | * | 10/2011 | ............ A01M 29/34 |

(Continued)

OTHER PUBLICATIONS

International Search Report and Written Opinion for PCT Application No. PCT/US2015/058597, mailed Jan. 28, 2016.

*Primary Examiner* — Darren W Ark
(74) *Attorney, Agent, or Firm* — Polsinelli PC

(57) ABSTRACT

An active barrier to termites and other insects includes a polymeric or paper substrate; and a copper-carbon matrix, wherein the copper-carbon matrix is incorporated into or is coated onto the polymeric or paper substrate. The resulting combination of the substrate and copper-carbon matrix allows for the creation of films, tapes, coated paper and fabric, or molded or formed parts that interfere with and block the passage or entry beyond the barrier of termites or other insects. Uses may be as diverse as but not limited to underlayment(s) for temporary, semi-permanent or permanent structures as well as films and barriers for walls, roofs of permanent, semi-permanent or temporary structures, or interior spaces, cabinets, or vehicles or protecting equipment, telecommunication gear, electronics or other assets that may be impacted, damaged or degraded by termite or other such insect infestation.

22 Claims, 1 Drawing Sheet

Related U.S. Application Data

(60) Provisional application No. 62/081,978, filed on Nov. 19, 2014.

(58) Field of Classification Search
USPC .............. 43/132.1, 124, 1; 52/101; 422/8, 7; 428/922
See application file for complete search history.

(56) References Cited

U.S. PATENT DOCUMENTS

| | | | | |
|---|---|---|---|---|
| 2,165,500 | A * | 7/1939 | Muirhead | A01M 1/24 43/107 |
| 2,899,771 | A * | 8/1959 | Burris, Jr. | A01M 1/245 52/517 |
| 2,952,938 | A * | 9/1960 | Abrams | E04B 1/62 52/517 |
| 3,258,872 | A * | 7/1966 | Senkewich | A01M 1/223 43/132.1 |
| 3,826,035 | A * | 7/1974 | Paniagua | A01M 1/223 47/1.3 |
| 3,857,934 | A * | 12/1974 | Bernstein | B32B 27/00 424/404 |
| 4,118,752 | A * | 10/1978 | Iguchi | A01K 67/0331 256/10 |
| 4,223,468 | A * | 9/1980 | Lawrence | A01M 3/007 43/132.1 |
| 4,366,644 | A * | 1/1983 | Lawrence | H05C 1/02 43/132.1 |
| 4,424,900 | A * | 1/1984 | Petcavich | H01L 23/60 206/720 |
| 4,471,561 | A * | 9/1984 | Lapierre | A01M 1/18 361/232 |
| 4,471,562 | A * | 9/1984 | Brucker | A01M 1/18 43/108 |
| 4,471,872 | A * | 9/1984 | Dedow | B65D 81/03 383/127 |
| 4,648,508 | A * | 3/1987 | Neal | B29C 48/335 206/524.2 |
| 4,667,436 | A * | 5/1987 | Benson | A01M 17/00 43/132.1 |
| 4,706,941 | A * | 11/1987 | Sherdan | A01G 13/105 256/10 |
| 4,746,574 | A * | 5/1988 | Hattori | B32B 27/32 428/458 |
| 4,747,229 | A * | 5/1988 | Chambers | A01G 13/105 43/112 |
| 4,756,116 | A * | 7/1988 | Cutter | A01G 13/105 43/108 |
| 4,782,623 | A * | 11/1988 | Lawrence | A01M 1/223 43/132.1 |
| 4,817,331 | A * | 4/1989 | Podsiadly | A01M 19/00 47/1.3 |
| 4,839,984 | A * | 6/1989 | Saunders | A01M 1/24 43/112 |
| 4,944,916 | A * | 7/1990 | Franey | C08K 3/08 205/730 |
| 5,008,485 | A * | 4/1991 | Kitagawa | H05K 9/0015 174/356 |
| H998 | H * | 12/1991 | Gerharz | 116/22 A |
| 5,154,886 | A * | 10/1992 | Franey | C08K 3/08 428/922 |
| 5,175,959 | A * | 1/1993 | Scholnick | A01G 13/105 43/124 |
| 5,210,719 | A * | 5/1993 | Lawrence | A01M 1/223 43/132.1 |
| 5,256,335 | A * | 10/1993 | Byrd | C08K 7/06 252/511 |
| 5,337,513 | A * | 8/1994 | Harvey | A01G 13/105 43/108 |
| 5,435,096 | A * | 7/1995 | Nekomoto | A01M 1/223 43/112 |
| 5,637,377 | A * | 6/1997 | Vermillion | B32B 29/00 206/709 |
| 5,756,007 | A * | 5/1998 | Franey | H01L 23/60 252/511 |
| 5,927,024 | A * | 7/1999 | Toutountzis | A01M 29/34 52/292 |
| 5,959,021 | A * | 9/1999 | Franey | H01L 23/60 524/495 |
| 6,223,463 | B1 * | 5/2001 | Carlson | A01M 1/18 43/108 |
| 6,223,464 | B1 * | 5/2001 | Nekomoto | A01M 1/223 43/132.1 |
| 6,837,001 | B2 * | 1/2005 | Amburgey | A01M 29/16 43/132.1 |
| 6,993,867 | B2 * | 2/2006 | Toyota | A01M 29/26 43/99 |
| 7,218,234 | B2 * | 5/2007 | Tirkel | A01M 1/026 340/552 |
| 7,434,788 | B2 * | 10/2008 | Foster | A01M 29/28 47/33 |
| 7,603,816 | B1 * | 10/2009 | Hohmann, Jr. | E04B 1/2604 43/132.1 |
| 7,698,853 | B2 * | 4/2010 | Ragon | A01M 1/02 43/132.1 |
| 7,707,767 | B2 * | 5/2010 | Ragon | A01M 29/28 43/132.1 |
| 7,712,247 | B2 * | 5/2010 | Wijenberg | A01M 1/026 43/121 |
| 8,015,757 | B1 * | 9/2011 | Hohmann, Jr. | E04B 1/72 43/132.1 |
| 8,071,200 | B2 * | 12/2011 | Lyublinski | B32B 27/32 428/354 |
| 8,844,191 | B2 * | 9/2014 | Sala | A01M 29/34 43/132.1 |
| 8,863,956 | B2 * | 10/2014 | Brooks | H01L 21/67396 206/454 |
| 9,107,350 | B2 * | 8/2015 | Shields | A01G 9/02 |
| 9,450,301 | B2 * | 9/2016 | Cink | A01M 1/226 |
| 11,291,199 | B2 * | 4/2022 | Donaldson | A01M 29/28 |
| 2002/0050318 | A1 * | 5/2002 | Donaldson | C23F 15/00 428/511 |
| 2003/0211255 | A1 * | 11/2003 | Allison | B25B 11/005 428/34.1 |
| 2004/0146690 | A1 * | 7/2004 | Vermillion | B32B 29/00 428/323 |
| 2004/0231231 | A1 * | 11/2004 | Cataldo | A01M 1/2061 43/132.1 |
| 2005/0221028 | A1 * | 10/2005 | Westcott | A01M 29/34 428/34.1 |
| 2006/0143974 | A1 * | 7/2006 | Pollmann | A01M 29/28 43/112 |
| 2006/0144531 | A1 * | 7/2006 | Reiss-Schmidt | E06B 9/522 160/330 |
| 2006/0201053 | A1 * | 9/2006 | Voris | A01M 1/20 43/124 |
| 2007/0039235 | A1 * | 2/2007 | Yoshida | C04B 28/02 43/124 |
| 2008/0024297 | A1 * | 1/2008 | Maki | H01B 11/1843 340/552 |
| 2008/0028668 | A1 * | 2/2008 | Pollman | A01M 1/223 116/22 A |
| 2009/0000216 | A1 * | 1/2009 | Kane | D04H 1/46 428/605 |
| 2010/0064578 | A1 * | 3/2010 | Karl | A01G 13/10 47/58.1 FV |
| 2010/0143432 | A1 * | 6/2010 | Zuehlke | A01M 29/34 43/132.1 |
| 2011/0154732 | A1 * | 6/2011 | Shields | A01M 29/30 43/107 |
| 2011/0189912 | A1 * | 8/2011 | Martinet | E04B 1/72 442/125 |
| 2012/0273358 | A1 * | 11/2012 | Larnoy | A01M 29/28 204/600 |
| 2013/0205687 | A1 * | 8/2013 | Sala | E04B 1/38 428/190 |

(56) References Cited

U.S. PATENT DOCUMENTS

| | | | | |
|---|---|---|---|---|
| 2014/0250768 A1* | 9/2014 | Lee | ............... | A01G 7/06 43/132.1 |
| 2014/0317997 A1* | 10/2014 | Wang | ............... | A01M 1/223 43/132.1 |
| 2015/0282471 A1* | 10/2015 | Lampman | ............... | A01M 29/24 404/71 |
| 2015/0292198 A1* | 10/2015 | Sala | ............... | E04B 1/38 52/745.21 |
| 2016/0029616 A1* | 2/2016 | Johnston | ............... | E06B 7/2309 43/132.1 |
| 2016/0345568 A1* | 12/2016 | Cink | ............... | H01Q 1/42 |
| 2018/0245730 A1* | 8/2018 | Yaeger | ............... | A01M 29/30 |

FOREIGN PATENT DOCUMENTS

| | | | | |
|---|---|---|---|---|
| AU | 2010311173 A1 * | 6/2012 | ............ | A01M 1/223 |
| EP | 2417850 A2 | 2/2012 | | |
| GB | 2518368 A * | 3/2015 | ............ | A01M 29/24 |
| JP | 02009806 A | 1/1990 | | |
| JP | 03175924 A | 7/1991 | | |
| JP | 06086625 A | 3/1994 | | |
| JP | 06211613 A | 8/1994 | | |
| JP | 10245506 A | 9/1998 | | |
| JP | 2000300151 A | 10/2000 | | |
| JP | 2000303581 A | 10/2000 | | |
| JP | 2000320034 A | 11/2000 | | |
| JP | 2001045958 A | 2/2001 | | |
| JP | 2001136896 A | 5/2001 | | |
| JP | 2001152567 A | 6/2001 | | |
| JP | 2001169713 A | 6/2001 | | |
| JP | 2001173117 A | 8/2001 | | |
| JP | 2001211810 A | 8/2001 | | |
| JP | 2001286254 A | 10/2001 | | |
| JP | 2002167878 A | 6/2002 | | |
| JP | 2002371643 A | 12/2002 | | |
| JP | 2003092977 A | 4/2003 | | |
| JP | 2003119919 A | 4/2003 | | |
| JP | 2004121206 A | 4/2004 | | |
| JP | 2004121207 A | 4/2004 | | |
| JP | 2004257198 A | 9/2004 | | |
| JP | 2004305103 A | 11/2004 | | |
| JP | 2004352351 A * | 12/2004 | | |
| JP | 2007274954 A | 10/2007 | | |
| JP | 2009084902 A | 4/2009 | | |
| JP | 2009203187 A | 9/2009 | | |
| JP | 2011099321 A | 5/2011 | | |
| JP | 2011117218 A | 6/2011 | | |
| JP | 2017123800 A | 7/2017 | | |
| WO | WO-0243487 A2 * | 6/2002 | ............ | A01M 1/20 |
| WO | 02089570 A1 | 11/2002 | | |
| WO | 0243487 A3 | 3/2003 | | |
| WO | 2010061424 A1 | 6/2010 | | |
| WO | 2012-A79111 | 1/2012 | | |
| WO | WO-2012037601 A1 * | 3/2012 | ............ | A01M 29/34 |
| WO | 2016081184 A1 | 5/2016 | | |

* cited by examiner

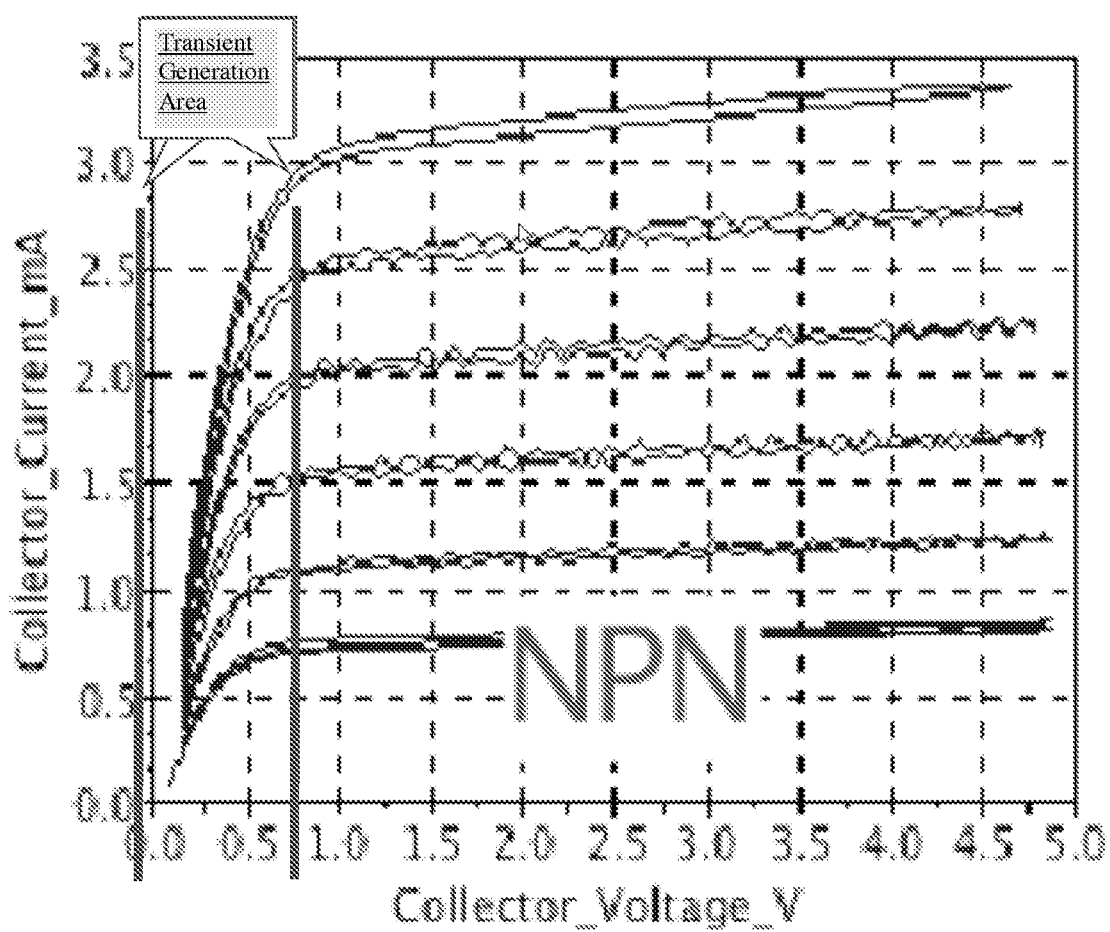

INSECT BARRIER

CROSS-REFERENCE TO RELATED APPLICATIONS

This application is a division of U.S. application Ser. No. 14/811,444, filed Jul. 28, 2015, which claims the benefit of U.S. Provisional Application No. 62/081,978, filed Nov. 19, 2014, and wherein each of the aforementioned applications is expressly incorporated herein by reference in their entirety.

TECHNICAL FIELD OF THE INVENTION

The present disclosure relates to articles and compositions, methods of making the articles and compositions, and methods of using the articles and compositions for suppressing and/or protecting against the intrusion of termites and/or other insects.

BACKGROUND OF THE INVENTION

Termites and termite infestation is an expensive and pervasive problem. Typically, chemicals or mesh screens are used to try to either kill termites or provide a physical barrier to prevent them from entering an area. Termites are known to be attracted to electric fields of certain wavelengths, and devices have been prepared to emit the exact frequencies and intensities required to manipulate termite behavior (see, U.S. Pat. Nos. 7,698,853 and 7,707,767). In addition, it is known that insects can accumulate an electric charge in flight when their body parts are moved or rubbed together, which may play a role in social communication (see, Greggers U, Koch G, Schmidt V, Dürr A, Floriou-Servou A, Piepenbrock D, Göpfert M C, Menzel R., Reception and learning of electric fields in bees, Proc. R. Soc. B. 20130528). However, there are limitations and/or potentially health and safety issues with the various current systems.

Accordingly, there is a need in the art for new articles and compositions for suppressing and/or protecting against the intrusion of termites and/or other insects.

SUMMARY OF THE INVENTION

The present application provides articles, compositions, and methods for suppressing and/or protecting against the intrusion of termites and/or other insects by use of an active barrier.

In various embodiments of the invention, methods and compositions are provided in which electrical effects are used to suppress and/or protect against the intrusion of insects. In preferred embodiments, compositions are used which form an active barrier to insect intrusion as a result of the electrical effects produced by those materials.

In one preferred embodiment, an active barrier is used which interferes with the retransmission of communication signals among insects, causing them to move away from the barrier. In one such embodiment, the barrier interferes with insect communication by causing out of phase retransmission of the insects' electrical communication signals, causing confusion among the insects and causing them to move away from the material.

In a alternative or additional preferred embodiments, a triboelectric effect (tribo-electric charging) is used to trouble insects and cause them to move away from a particular material and/or location. In one such preferred embodiment, methods are utilized in which an active barrier is provided having a sufficiently low activation threshold such that tribo-electric charging when an insect moves along the barrier's surface generates voltages sufficiently high to trigger electrical transients that will trouble the insect and cause it to move away.

Preferably, materials are provided producing the electrical effects described above, when an insect moves along or is in proximity to the material's surface.

In various preferred embodiments, the active barrier to termites and/or other insects includes: a polymeric or paper substrate; and a copper-carbon matrix, wherein the copper-carbon matrix is incorporated into and/or is coated onto the polymeric or paper substrate.

In various embodiments, the polymeric substrate may be a polyethylene based polymer, a low-density polyethylene (LDPE) based polymer, a linear low-density polyethylene (LLDPE) based polymer, a high-density polyethylene (HDPE) based polymer, a polypropylene (PP) based polymer, a polystyrene based polymer, a polyurethane based polymer, a polyacrylic based polymer, a polyethylene terephthalate (PET) based polymer, or a combination thereof.

In embodiments, the polymeric substrate may be a blend of about 40% LDPE and about 60% LLDPE, or a combination thereof.

In embodiments, the copper-carbon matrix may include copper powder or copper flake, and carbon black.

In embodiments, the copper-carbon matrix may include copper particles having an inner layer core of copper with a discontinuous outer layer of cupric oxide (CuO) and/or cuprous oxide ($Cu_2O$).

In embodiments, the copper-carbon matrix may include copper particles ranging from about 0.5 microns to 70 microns in size; and from about 3% by weight to about 28% by weight of the copper-carbon matrix.

In embodiments, the copper-carbon matrix may include carbon black in a concentration sufficient to achieve electrostatic dissipative (ESD) levels of about $10^4$ to $10^{10}$ ohms/square.

In embodiments, the copper-carbon matrix may include carbon black from about 3% by weight to about 25% by weight of the copper-carbon matrix.

In embodiments, the active barrier may also include at least one additive in and/or on the polymeric or paper substrate and the copper-carbon matrix for improving the insect repelling properties of the active barrier, wherein the at least one additive is an insecticidal compound used to treat wood surfaces.

In embodiments, the active barrier may also include at least one inert polymeric carrier, wherein the inert polymeric carrier is a convoluted sheet, a textured sheet, a film, a laminated structure, a paper, an adhesive tape, a non-adhesive tape, a fabric, a foam, a mesh, or an extrusion form or shape.

In embodiments, the active barrier may also include at least one adhesive on at least one side of the active barrier to form a self-stick tape.

In embodiments, the active barrier may also include at least one additive selected from graphite particles and spheres, graphite coated glass, carbon nano-particles, and amine and amide based anti-static additives.

In embodiments, the active barrier may also include at least one additive present in the active barrier in at least about 2% by weight of the active barrier.

In embodiments, the active barrier may act to prevent insects from crossing, eating, or penetrating through or into the polymeric or paper substrate and copper-carbon matrix.

In embodiments, the active barrier may include an electrical activation threshold of less than the tribo-electric charging of an insect moving over a surface of the barrier.

In embodiments, the active barrier may include an activation threshold that is inherently low enough to cause a transmission of spurious electrical transmissions as an insect moves onto a surface of the barrier.

In other embodiments, the inventions provide methods for suppressing and/or protecting against intrusion of termites and other insects, by the steps of: a) placing an active barrier adjacent to an area to be suppressed and/or protected, wherein the active barrier includes: a polymeric or paper substrate; and a copper-carbon matrix, wherein the copper-carbon matrix is incorporated into or is coated onto the polymeric or paper substrate; and b) allowing the termites and other insects to move over a surface of the active barrier, wherein the electrical and physical properties of the active barrier suppresses and/or protects against intrusion of termites and other insects.

In embodiments, the active barrier used in the methods for suppressing and/or protecting against intrusion of termites and other insects may also include at least one adhesive on at least one side of the active barrier to form a self-stick tape, wherein the active barrier is placed under, around, above and/or inside the area.

In other embodiments, the inventions provide methods for preparing an active barrier to termites and other insects, by the steps of: a) incorporating or coating a copper-carbon matrix into a polymeric or paper substrate; b) placing the active barrier adjacent to an area to be suppressed and/or protected; and c) allowing the termites and other insects to move over a surface of the active barrier, wherein an electrical activation threshold of the active barrier is less than tribo-electric charging of an insect moving over a surface of the barrier, and wherein the activation threshold of the active barrier is inherently low enough to cause a transmission of spurious electrical transmissions as the termites and other insects move onto the active barrier thereby suppressing and/or protecting the area against the intrusion of termites and other insects.

In embodiments, the copper-carbon matrix used in the methods for preparing the active barrier is incorporated into the polymeric or paper substrate by pressing, mixing, or blending copper and carbon black into the polymer or paper substrate; and/or by coating the polymer or paper substrate with a suspension of copper and carbon black in a vehicle.

BRIEF DESCRIPTION OF THE DRAWINGS

FIG. 1 provides an illustration of typical CMOS currents/collector voltages, and secondary transmissions of spurious electrical transients generated by switching on a CMOS current/collector voltage according to an exemplary embodiment.

DETAILED DESCRIPTION OF THE INVENTION AND THE PREFERRED EMBODIMENTS

The present inventions provide articles, compositions and methods for the suppression of and/or protection against the intrusion of termites and/or other insects.

In various embodiments of the invention, electrical effects are used to suppress and/or protect against the intrusion of insects. In preferred embodiments, materials are used which form an active barrier as a result of the electrical effects produced by those materials.

In one preferred embodiment, an active barrier is used which interferes with the retransmission of communication signals among insects, causing them to move away from the barrier. In one such embodiment, the barrier interferes with insect communication by causing out of phase retransmission of the insects' electrical communication signals, causing confusion among the insects and causing them to move away from the material.

In alternative or additional preferred embodiments, a triboelectric effect (tribo-electric charging) is used to trouble insects and cause them to move away from a particular material and/or location. In one such preferred embodiment, methods are utilized in which an active barrier is provided having a sufficiently low activation threshold such that tribo-electric charging when an insect moves along the barrier's surface generates voltages sufficiently high to trigger sufficiently serious transients that will trouble the insect and cause it to move away.

In further embodiments, materials are provided producing the electrical effects described above, when an insect moves along or is in proximity to the material's surface.

In various preferred embodiments, the inventions provide an active barrier to termites and/or other insects having a polymeric or paper substrate; and a copper-carbon matrix, wherein the copper-carbon matrix is incorporated into and/or is coated onto the polymeric or paper substrate. In one such embodiment, the polymeric or paper substrate may include an adhesive layer on at least one surface, for example, a back surface, to form a self-stick tape. It has been found that these materials provide a barrier to termites and/or other insects to keep them from crossing, eating or penetrating through or into the active barrier.

In various of the embodiments, the inventions provide a polymeric substrate, e.g. a plastic film, or a paper substrate, which includes a copper additive and a carbon matrix that has been incorporated into and/or onto the substrate. In various embodiments, the inventions provide methods for preparing and utilizing these materials, films and/or tapes under, around, above and/or inside structures to keep those structures free from termites and/or other insects.

In preferred embodiments, the inventions provide a polymeric substrate, e.g., plastic film, or paper substrate or any other suitable material, which is either manufactured with and/or coated with materials that change the electrical and physical properties and nature of the substrate and/or materials in such a way that those properties discourage, inhibit or bar termites and/or other insects from wanting to either cross, climb, bridge, self-sacrifice or chew through.

In preferred embodiments, the electrical and physical properties may be modified such that the electrical activation threshold of the substrate and/or materials is less than the triboelectric charging of an insect moving over a surface of the substrate and/or materials. In embodiments, the copper additive component may act as a CMOS (Copper Metal Oxide Semiconductor), which transitions the substrate and/or materials from being electrically insulative to being able to electrically conduct or have electric current flow through or across the substrate and/or materials. For example, the activation threshold may be inherently low enough to cause a transmission of spurious electrical transmissions as the termite and/or other insect moves onto a surface of the substrate and/or materials. The ensuing generation of spurious electrical transients causes a disruption in the normal communications of the termites and/or other insects, thus causing them to withdraw from the surface by interfering with and/or disrupting the electrical transmitting characteristics of the termite and/or other insects.

In various embodiments of the inventions, a copper additive may be incorporated into and/or is coated onto a polymeric substrate, e.g. a plastic film, or paper substrate to assist in increasing the barrier properties of the original polymer or paper substrate, and to improve protection against termites and/or other insects. Copper additives may increase the density of a polymeric or paper substrate by increasing the barrier properties of the substrate, for example, by decreasing the gas and moisture permeation through the substrate. In accordance with the various embodiments, the barrier properties provided may include substrates having in the range from about 1 to about 50%, or from about 3% to about 40%, or from about 5% to 35%, or from about 32% copper additive.

In various embodiments, a conductive material such as a highly conductive carbon material may be associated with and/or bound to a copper additive to form a copper-carbon matrix in and/or on the polymeric and paper substrates. For example, the copper-carbon matrix may be formed in and/or on the substrate through the application of heat and/or pressure and reactions between the copper additive and carbon particles. The resultant copper-carbon matrix product may exhibit an electric surface resistance levels of about $10^{10}$ Ohms/square or less; for example, from about $10^4$ to about $10^{10}$ Ohms/square.

In embodiments, the combination of the copper component with a conductive material, such as carbon black, may be used to enhance the material's deterrent properties against termite or insect infestation. Or, as an alternative to a conductive carbon or carbon black, other additives such as surfactant-based chemistries may be used. In general, the additive (whether carbon black or otherwise) is utilized to impart to the material the ability to conduct or allow for the flow of electrons or electrical charge(s) from one copper particle to another, for example, a copper oxide coated copper core particle to another.

In addition, the combination of a copper additive and carbon black material may create a permanent change to the electrical properties of the material that the copper-carbon matrix is put into. The matrix being added to the material during extrusion, various molding operations or injection or other plastic processes, or being added to plastic, paper or other substrates that may be coated or have a coating applied to them.

In various preferred embodiments, the combination of a copper-carbon matrix is provided to create a material that has an activation threshold of less than about 1 volt. This activation threshold is the level at which an applied voltage will drive a semi-conductor material into conduction (in this case a Copper Metal Oxide Semiconductor (CMOS)) from being insulative to being able to conduct or flow electrons or electrical current. The injection of less than about 1 volt to this matrix will turn the CMOS material on as it approaches voltages ranging from about 0.01 to 1.0 volts. The result of this switching generates secondary transmissions of spurious electrical transients (see, FIG. 1) such as in a counter-EMF (electromotive force). This low activation threshold allows the material to interfere or interrupt/interact with the electrical communication transmissions of termites and other such insects.

In various embodiments, the combination of a copper-carbon matrix is provided to create a material including but not limited to a film, which acts as a semi-conductor device. The applied voltage level at which the material/film becomes able to flow electricity is about 0.7 volts. As it relates to termites and/or other insects, when the voltage emitted by the termite/insect communication reaches about 0.7 volts, the material/film becomes electrically active and re-transmits the voltage signal, but due to the delay it is re-transmitted out of phase and includes the switching transients. This out of phase re-transmission of the communication signal along with the transient signals interfere with the communication that the termites and/or other insects have, making it impossible for them to communicate and hence, acts as a pesticide device discouraging them from breaching the barrier material/film.

Either because of the inherent electrical properties of the film, coating or treated part, or its inherent electrical counter EMF field produced by the treated film or substrate, the resulting material provides a barrier to termites. This barrier includes being able to provide a layer that: termites choose not to, or are unable to chew into or through; provides a surface that forces the insects to not self-sacrifice (a typical behavior of termites where the insect will do an activity which results in its death, but enables an area to be breached or partially breached); that termites are not able to bridge (another behavior inherent in termites and ants that allows them to self-sacrifice to cross an area providing their bodies as a "bridge" to others); and that termites do not attempt to cross even though there is a food source, or potential food source on the other side of the barrier. Testing also showed that this created copper-carbon black matrix based film, coating, part or tape also discourages or stops termites from wanting to climb vertically on the material in order to transit to a food source.

In various embodiments, the neutralization materials, being copper and carbon black, may be physically or chemically suspended in a suitable vehicle, such as a polyurethane, and the suspension coated, for example by airless spraying or roller coating, into and/or onto the polymeric and/or paper substrate. In other embodiments, copper and carbon black may be impressed, for example by a printing press or any other suitable means, into and/or onto the polymeric and/or paper substrate, or any other surface to be protected. For example, copper and carbon black may be inserted into and/or onto a carrier material such as a polymeric or paper sheet, which may be used as a wrapping or liner for the interior and/or exterior of an enclosure or structure for the item to be protected.

For open unenclosed environments, an active barrier may be applied to the area to be protected as an entire underlayment where infestation is considered to be a high risk. Likewise, where there is a need to protect from infestation from above, the area may be covered with the disclosed active barrier. In addition, the same polymeric and/or paper substrate may be modified with the copper-carbon matrix described herein may also be provided in the form of an adhesive or tacky or stretchy type of tape to secure edges and/or other gaps that the substrate cannot easily protect, fill or cover.

In a further embodiment, the active barrier may include an ink or plastic material that uses an inert polymer carrier to hold the additives of copper and carbon black. The inert carrier may be in sheet (convoluted or textured), film, laminated structures, paper, tape (adhesive and non-adhesive), fabric, foam, mesh, extrusions, or other forms or shapes that offer a significant contact surface area to actual external area size or weight ratio.

In various embodiments, the copper additive is a copper powder or flake. Such materials, for example, may be produced by electro-deposition, atomization, by gaseous reduction of finely divided oxides, precipitation from solutions, or by sintering. In one embodiment, pure copper powder is used in flake form. Alternatively, flake powder may be used such as so-called "gold bronze" powders, produced from alloys of copper with zinc and aluminum.

In various embodiments, the copper particles have a core of copper with a discontinuous outer layer comprised of copper oxide in a mixed oxidation state of both cupric oxide (CuO) and cuprous oxide ($Cu_2O$). For example, an embodiment (which is not intended to be limiting) is copper powder material produced by US Bronze.

Further, the copper particles utilized may range from about 0.5 microns to about 70 microns in size. Alternatively, copper particles ranging from about 0.1 microns to about 100 microns may be used since the functionality of the copper is provided at any of these additive levels.

In various embodiments, the levels of copper additives utilized are in in the range from 3% by weight to 28% by weight of the copper-carbon matrix. Alternatively, copper additives ranging from about 1% by weight to about 50% by weight, or from about 2% by weight to about 40% by weight, or from about 3% by weight to about 30% by weight of the copper-carbon matrix may be used.

In a further embodiment, an additional additive is used in the polymer, along with the copper, to improve the insect repelling properties of the material. Such additives include but are not limited to insecticidal compounds used to treat surfaces, specifically wood products, including organophosphorus insecticides such as phoxim and chloropyriphos, as well as those classified in the pyrethroid series insecticides such as permethrin, deltamethrin, cypermethrin, fenvalerate, and cyfluthrin. Additional insecticides include 1-(6-chloro-3-pyridylmethyl)-2-nitromethylene-imidazolidine, 3-(6-chloro-3-pyridylmethyl)-2-nitro-methylene-thiazolidine, 1-(6-chloro-3-pyridylmethyl)-2-nitroimino-imidazolidine, 1-(6-chloro-3-pyridylmethyl)-2-nitromethylene-tetrahydropyrimidine, and 3-(6-chloro-3-pyridyl-methyl)-2-nitromethylene-tetrahydro-2H-1,3-thiazine.

In various embodiments, the further additive is carbon black. The concentration of the variety of carbon black used may be adjusted so as to achieve electro-static dissipative (ESD) levels of about $10^4$ to $10^{10}$ ohms/Sq. For example, in an embodiment (which is not intended to be limiting) a conductive carbon black compound may be used from any number of polymeric or plastic compounds domestically as well as internationally.

Direct addition of conductive carbon black particles to an extruder is generally cumbersome, whereas the addition of pre-compounded conductive carbon black particles in a low-density polyethylene (LDPE) or linear low-density polyethylene (LLDPE) carrier (fractional melt up to 3 MI (melt index)) is ideal for manufacturing the plastic extruded film, sheets, foam, tape substrate and/or other materials that would function as a physical barrier. Higher MIs are used for injection-molded materials that can also be made into rigid barriers.

The carbon compound is blended together in the extruder with copper powder, which is then incorporated into a polymeric substrate. Ideally the subsequent compound will have ESD measurements between about $10^3$ and $10^{10}$ ohms per square. This is achievable by the use of highly conductive carbon black at levels of about 10-15% by weight of the copper-carbon matrix, or generic carbon black with addition levels of about 15% to 25% by weight of the copper-carbon matrix.

In another embodiment, an electrically conductive carbon black is utilized that is in the range of about 3% to 15% by weight of the copper-carbon matrix. Alternatively, carbon black ranging from about 1% to about 20% by weight of the copper-carbon matrix may be used.

Alternatively, instead of carbon black, other conductive carbons or other materials may be used as additives. In particular, additives are used that provide surfactant based chemistries that impart into a material the ability to conduct or allow for the flow of electrons or electrical charge(s) from one copper oxide coated copper core particle to another. For example, graphite coated glass, graphite particles and spheres; carbon Nano-particles, amines and amide based anti-static additives (at addition levels of at least 2%) may be used.

With respect to the polymer, in accordance with one embodiment, the polymer is a blend of LDPE/LLDPE. A blend of about 40% LDPE with about 60% of LLDPE (Hexane) may be utilized to achieve desired physical characteristics. Alternatively, a blend of about 30% LDPE with about 70% of LLDPE (Hexane) may be utilized. In addition, any other polyethylene, or polyethylene blend may be utilized. In particular, the actual blend can vary depending on what strength and flexibility is required. For example, in further embodiments, other polymers may be used such as HDPE, PP, styrene, urethane, acrylic, or PET based polymers, or other polyolefin or polystyrene plastics may be used, or any combinations of these materials.

In various embodiments, the copper and carbon black materials may be incorporated into the polymeric or paper substrate by reactions generated by the application of heat, pressure, and time in the extruder, under standard conditions used for extrusion of LDPE or LLDPE plastics. Specifically, the copper and carbon black compounds are mixed into the extruder during the extrusion process. The copper, carbon black, and polymeric or plastic compounds appear to engage in an exothermic reaction when the standard temperatures of extrusion are reached, which is believed to play a role in the ease of mixing of the compounds together during the extrusion.

As a further example, any of the methods used in the Franey patent (U.S. Pat. No. 4,944,916) or the Donaldson patent (U.S. Pat. No. 6,593,007) may be used, both of which patents are fully incorporated herein by reference.

It should be appreciated that in various embodiments, the present inventions provide an active barrier of a film, fabric, tape (with or without adhesives), foam, extrusion, formed parts or components or coated parts, films or components, or any other suitable media or base that uses a copper-carbon matrix (or other suitable matrix) in a polymeric or paper substrate to create a barrier to termite intrusion and/or the intrusion of other insects. In the tape embodiment, it should be appreciated that the tape created can provide a way to seal holes, and/or to keep films or other substrates using the copper-carbon matrix technology secured down, and/or to provide a way to adhere the active barrier to other surfaces, walls, structures, items or components. Alternatively, the materials used may be made into underlayment materials for being put below houses, buildings, structures, or vehicles, whether these items are stationary, permanent or semi-permanent, or transient.

The above description is considered that of certain embodiments of the present invention only. Modifications of the invention will occur to those skilled in the art and to those who make or use the invention. Therefore it is understood that the embodiments described herein are merely for illustrative purposes only and are not intended to limit the scope of the invention.

What is claimed is:

1. A method of protecting a structure against an intrusion of insects from a surrounding environment, the method comprising:

placing an active barrier between the surrounding environment and the structure which is to be protected from the insect intrusion, wherein the structure is coupled to a ground surface, wherein the active barrier includes a polymeric substrate having a copper-carbon matrix formed therein, the copper-carbon matrix having a copper concentration and a carbon concentration that produces an activation threshold of less than about 1.0 volt, such that the active barrier interferes with electrical communication transmissions of the insects, wherein the copper-carbon matrix produces an electro-static dissipative level sufficient to interfere with the electrical communication transmissions used by the insects to communicate, and wherein the electro-static dissipative level is from about $10^3$ to about $10^{10}$ ohms per square; and repelling the insects from the active barrier towards the surrounding environment by interfering with the electrical communication transmissions of the insects.

2. The method of claim 1, the copper-carbon matrix is extruded into the polymeric substrate.

3. The method of claim 1, further comprising an inert polymer carrier, the inert polymer carrier selected from one or more of a convoluted sheet, a textured sheet, a film, a foam, a mesh, a tape, or a combination thereof.

4. The method of claim 1, wherein the active barrier has an active threshold of about 0.7 volts.

5. The method of claim 1, wherein the structure is one or more of a house, a building, or a vehicle.

6. The method of claim 1, wherein the active barrier is placed as an underlayment to the structure.

7. The method of claim 1, wherein the structure is enclosed by the active barrier.

8. The method of claim 1, wherein the copper-carbon matrix comprises carbon black.

9. The method of claim 8, wherein the carbon black is present in an amount of from about 10% by weight to about 25% by weight, based on a total weight of the copper-carbon matrix.

10. The method of claim 1, wherein the copper-carbon matrix comprises copper particles.

11. The method of claim 10, wherein the copper particles range from about 0.5 microns to about 70 microns in size.

12. The method of claim 10, wherein the copper particles range from about 3% to about 28% by weight, based on a total weight of the copper-carbon matrix.

13. The method of claim 1, wherein the active barrier comprises at least one additive, the at least one additive being an insecticidal compound.

14. The method of claim 1, wherein the copper-carbon matrix comprises copper particles having an inner layer core of copper with a discontinuous outer layer of cupric oxide and/or cuprous oxide.

15. The method of claim 1, further comprising at least one adhesive on a surface of the active barrier to form a self-stick tape.

16. The method of claim 1, wherein an electrical activation threshold of the active barrier is less than a tribo-electric charging of an insect moving over a surface of the barrier.

17. The method of claim 1, wherein the active barrier acts to prevent insects from crossing, eating, or penetrating through or into the polymeric substrate.

18. The method of claim 1, wherein the copper-carbon matrix comprises copper particles from copper powder.

19. The method of claim 1, wherein the active barrier does not include an insecticide additive.

20. The method of claim 1, wherein the active barrier does not include an adhesive layer.

21. A method comprising:

placing an active barrier between a surrounding environment and an item which is to be protected from insect infestation, wherein the active barrier partially encloses the item such that at least a portion of the item is open to the surrounding environment, wherein the active barrier includes a polymeric substrate having a copper-carbon matrix formed therein, the copper-carbon matrix having a copper concentration and a carbon concentration that produces an activation threshold of less than about 1.0 volt, such that the active barrier interferes with electrical communication transmissions of insects, wherein the copper-carbon matrix produces an electro-static dissipative level sufficient to interfere with the electrical communication transmissions used by the insects to communicate, and wherein electro-static dissipative level is from about $10^3$ to about $10^{10}$ ohms per square; and repelling the insects from the active barrier towards the surrounding environment by interfering with the electrical communication transmissions of the insects.

22. The method of claim 21, wherein the item is one or more of a surface, wall, structure, or component.

* * * * *

UNITED STATES PATENT AND TRADEMARK OFFICE
CERTIFICATE OF CORRECTION

PATENT NO. : 12,207,644 B2
APPLICATION NO. : 17/168345
DATED : January 28, 2025
INVENTOR(S) : Keith Donaldson et al.

Page 1 of 1

It is certified that error appears in the above-identified patent and that said Letters Patent is hereby corrected as shown below:

In the Claims

In Claim 2, Column 9, Line 20, insert -- wherein -- between "claim 1," and "the copper-carbon".

Signed and Sealed this
Twenty-fourth Day of June, 2025

Coke Morgan Stewart
*Acting Director of the United States Patent and Trademark Office*